United States Patent Office 2,703,500
Patented Mar. 8, 1955

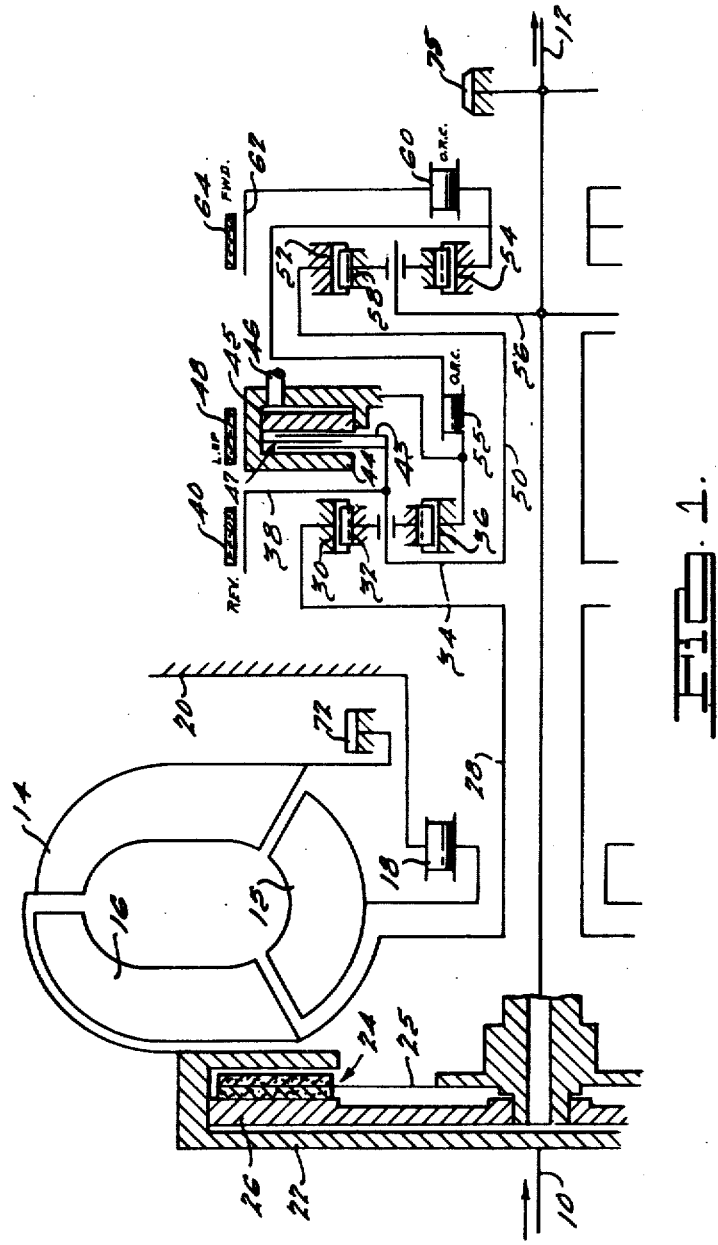

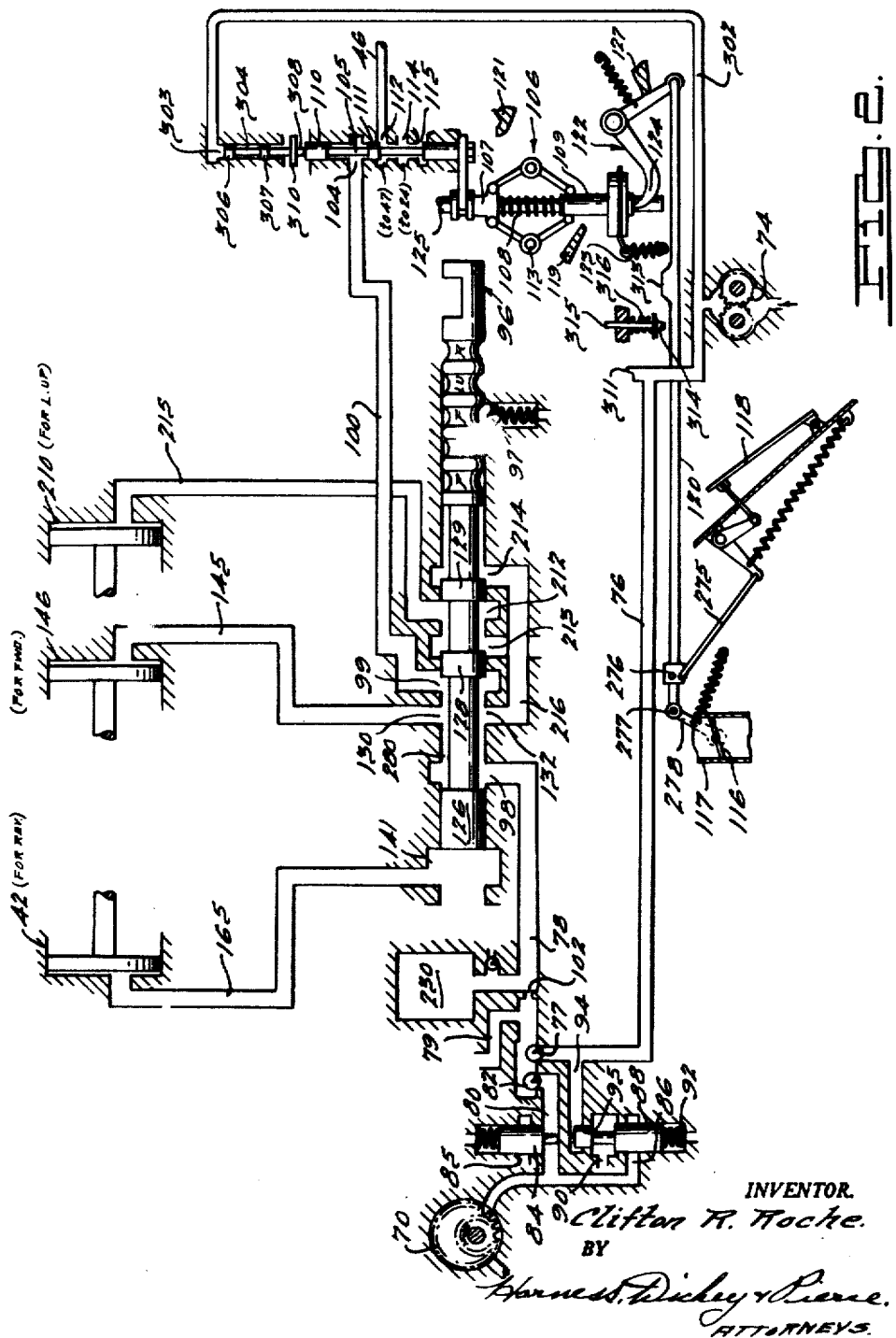

2,703,500

AUTOMATIC TRANSMISSION CONTROL

Clifton R. Roche, Los Angeles, Calif.

Application October 16, 1950, Serial No. 190,383

10 Claims. (Cl. 74—731)

This invention relates to control systems for automatic transmissions, particularly of the variety adapted for automotive installations.

An important object of the invention is to improve upon control systems adapted for use in conjunction with a transmission of the variety which incorporates both a hydraulic torque converter and variable speed gearing, and especially to improve the operation and operating characteristics of the system with respect to changes in the gear drive ratio at low vehicle speeds.

In practicing the present invention, a transmission is provided which incorporates at least two forward speed ratios, at least one of which is a geared ratio, the forward ratios being rendered operative and inoperative under the regulation of an automatic control valve. The action of the automatic control valve is influenced by vehicle speed and also directly or indirectly by the torque demand upon the vehicle or the expressed desire of the operator as to the desired torque output (as, for example, such desire may be expressed by the position of the accelerator pedal). Where the system also incorporates a hydraulic torque converter, as previously indicated, it is desirable to effect an upshift from the lowest gear ratio to a higher gear ratio, which may represent an intermediate speed, at a low vehicle speed, particularly at relatively light throttle, and it is also desirable to delay a downshift to the lowest geared speed, until the vehicle has come virtually to rest. It has not been feasible to accomplish these results by means of a governor alone, however, because of the practical mechanical difficulties involved in constructing a governor which could function in the described manner. In order to so arrange the governor that it will not cause a shift down until the vehicle is substantially stopped, the return spring on the governor (or the equivalent biasing means) must be so light that friction of the parts would often be greater than the force of the return spring at the low speeds. Thus, the slightest sticking due to dirt, binding or thickening of lubricant would prevent or appreciably affect the intended operation of the governor. The present invention achieves the described highly desirable operating characteristics with respect to low speed shifting in such transmissions, however, by novel supplemental counter-biasing means arranged to act in the same direction that the governor acts upon the automatic control valve in upshifting only, but during a limited portion of the movement of the control valve, which limited movement corresponds to shifting between the low and intermediate speeds, or between the starting range and driving range of the transmission, or analogous speeds which are the lowest two forward ranges in normal use in the transmission. Such supplemental counter-biasing means is responsive to movement of the vehicle.

Another object is to provide such an improved governor system having means of very simple, rugged and foolproof character which accomplishes the described results and which is not unduly sensitive.

Other objects and advantages will become apparent upon consideration of the present disclosure in its entirety.

In the drawings:

Figure 1 is a diagrammatic view corresponding to a longitudinal central sectional view of a transmission to which my improved control system is adapted to be applied; and Figure 2 is a diagrammatic view of the control system.

Referring now to the drawings, wherein Figure 1 shows diagrammatically the principal components of a transmission with which my improved control system is adapted to be used, reference character 10 designates the transmission input shaft which is adapted to be connected to the engine (not shown) and 12 designates the output shaft. These parts and other components of the transmission are shown diagrammatically, since their details form no part of my present invention. A detailed disclosure of a complete transmission of this character is contained in my copending application Serial No. 748,382, filed May 16, 1947, now Patent No. 2,645,137.

The input shaft 10 is rigidly connected to the pump portion 14 of a hydraulic torque converter which includes a conventionally illustrated reaction portion 15 and a turbine portion 16. The reaction portion 15 is connected through an overrunning brake 18 with a stationary portion 20 of the transmission casing. Input shaft 10 also drives the casing 22 of a direct drive disk clutch assembly 24, the driven disk 25 of which is rigidly connected to the output shaft 12. The casing 22 is formed as a cylinder within which is a piston 26 which also constitutes a pressure plate, as shown in Fig. 1, for applying the direct drive clutch.

The turbine 16 of the hydraulic torque converter is connected by means of a tubular shaft 28, encircling the axially disposed output shaft 12, to the internal toothed ring gear 30 of a planetary gearset which also includes planet gears 32 supported by a carrier 34 and a sun gear 36, the planet gears meshing with both of the gears 30, 36. The carrier 34 is rigidly connected to a drum 38 which encircles the planetary gearset, and the drum 38 is adapted to be gripped and held by a brake band 40 operable by means of a hydraulically operable servomotor 42. The carrier is also rigidly connected to a set of clutch plates 43, which coact with driven clutch portions, the driven clutch portions including one wall of a drum 44 which also defines a hydraulic cylinder within which is a piston 45 actuatable to apply the clutch when fluid is supplied to the interior of the cylindrical drum through a conduit 46. The drum is also adapted to be gripped by a brake band 48.

The carrier 34 is connected by a tubular shaft 50 to the internal toothed ring gear 52 of a second or rear planetary gearset. The sum gear 54 of the second planetary gearset is connected through an overrunning clutch 55 to the front sun gear 36 and drum 44. The carrier 56 for the planet gears 58 of the rear set is rigidly connected to the output shaft 12. Sun gear 54 is also connected through another overrunning clutch 60 with a brake drum 62 which is adapted to be gripped and held by a brake band 64.

It will be understood that the arrangement of transmission components is shown by way of example and might be varied without departing from the principles of the invention. With the transmission components arranged as in Fig. 1, the hydraulic control system is so constituted that in the lowest speed forward drive the brake band 64 is applied, and all of the other transmission clutches and brakes are released. The overrunning clutches 55 and 60 function in the same relative direction and coact to prevent reverse rotation of both of the sun gears 36, 54. The engine then drives the forward internal toothed gear 30 through the hydraulic torque converter. The front sun gear 36 is held against reverse rotation and the carrier 34 is accordingly carried forwardly as the planet gears 32 roll on sun gear 36. This carries the rear internal toothed gear 52 forwardly at reduced speed and the rear planet gears 58 are rolled forwardly on the sun gear 54, the carrier 56 and output shaft 12 being thereby driven at a further reduced speed through the double reduction afforded by the two planetary systems in addition to the reduction and torque multiplication derived from the hydraulic torque converter.

When a higher speed gear ratio is desired, the clutch (generally designated 47) in the drum 44 is also engaged, the band 64 remaining engaged, and the other brakes and clutch 24 remaining released. The front planetary gearset is thus locked up and rotates as a unit, the entire gear reduction being provided by the rear planetary gearset. A direct drive which eliminates the torque converter is provided by engagement of the direct drive clutch 24. A reverse drive is provided by engagement of the reverse brake band 40. In reverse, the planet gears 32 are turned forwardly upon their shafts in the stationary carrier 34 which is held by the brake band 40, and the sum gear 36 drives the rear sun gear 54 in a reverse direction through the overrunning clutch 55, which functions to transmit the drive in the reverse direction. The rear planetary gears 58 are thus rolled rearwardly upon the internal toothed gear 52 carrying the rear carrier 56 and output shaft 12 rearwardly at reduced speeds.

It will be observed that with this transmission arrangement when operating in the intermediate gear in which, as stated, the brake band 64 and the clutch 43—44 are engaged, if the vehicle is allowed to coast, that is, if the throttle is closed so that the rear wheels tend to drive the transmission mechanism, the drive from the rear wheels to the turbine member 16 of the torque converter is at the one-to-one ratio, rather than at the intermediate ratio at which the engine drives the rear wheels. This is due to the action of the overrunning clutches 55 and 60. When the wheels tend to drive the vehicle, in the intermediate gear, the overrunning clutch 60 releases, but the overrunning clutch 55 locks up because the rear wheels are tending to drive the driven member of this clutch forwardly with relation to the front sun gear 36, which is the relative direction in which this overrunning clutch locks up. Inasmuch as the clutch 43—44 is also engaged, the carrier 34 and hollow shaft 50 also turn as a unit with the sun gear 36 and the rear gearset is thus in effect also locked up.

In order to provide a two-directional low speed drive which will afford engine braking at the low gear ratio where desired, as for operating in hilly country, a brake band 48 is provided adapted to be engaged simultaneously with the brake band 64 to provide a low speed drive in both directions through the gearing. When the band 48 is engaged, the clutch 43—44 is released. When, with the lock-up band 48 and band 64 engaged, the rear wheels tend to turn faster than the engine, both sun gears are held stationary by the lock-up band 48, for although the rear overrunning clutch 60 would release under such conditions, the rear sun gear 54 is held against forward rotation by the band 48 acting through the intermediate overrunning clutch 55. It wil be seen that band 48 also at this time holds the front sun gear against forward rotation. The rear planetary gears, therefore, roll forwardly on the rear sun gear 54, and drive the internal gear 52 forwardly, which drives the front carrier 34 forwardly. The front planet gears 32 roll on the front sun gear 36 and drive the front internal gear 30 forwardly to turn the turbine member 16 of the hydraulic torque converter. The drag of the engine thus acts through the torque converter to oppose turning of the rear wheels.

As diagrammatically indicated in Fig. 2, the transmission also incorporates a pump 70 drivable by the engine, as by means of a gear 72 connected to the pump portion 14 of the hydraulic torque converter. Pump 70 is commonly referred to as the front pump. A second or rear pump 74 is provided drivable by the output shaft 12 as by means of a gear 75. The output of the rear pump is conducted through conduit means 76 and a check valve 77 to a main fluid supply conduit 78. The output of the front pump is conducted through a conduit 80 and check valve 82 to the same main supply conduit 78. Connected to the conduit 80 and actuatable by the pressure therein is a pressure relief valve plunger 84 which may be set to maintain the front pump output pressure at a predetermined value, as for example, 80 p. s. i., and to discharge any excess, when such value is exceeded, through a dump port 85. The output of the front pump is also connected by a branch conduit 86 to a side port of a spool valve 88 which normally maintains the passage 86 closed, but which is adapted to open, to connect passage 86 to a discharge port 90 when the rear pump pressure in the conduit 76 rises above a predetermined value, as for example when the rear pump pressure reaches 83 p. s. i. The valve 88 is urged toward closed position by a suitably calibrated spring 92 which is opposed by the pressure in conduit 76, the pressure in the conduit 76 communicating through a branch conduit 94 with a head formed by a spool 95 on the opposite end of the valve 88 from the spring 92. When the front pump is dumped by the rear pump, due to the downward movement of valve 88, to connect conduit 86 with discharge port 90 in the manner described, rear pump pressure is delivered to the main line 78 and holds the check valve 82 closed. Valve spool portion 95 also acts as a pressure limiting valve for the rear pump, by discharging excess through the port 90 when the pressure in conduit 94 is sufficient to force the spool portion 95 downwardly far enough to establish communication between passage 94 and port 90.

The control system incorporates a manually operable selector valve, generally designated 96, shown as movable to reverse, lock-up, forward, neutral and park positions and which is illustrated in the forward or "F" position. In a typical automotive installation, this valve might be shiftable by a hand lever on the steering column. Valve 96 is of the multiple spool type and has an inlet port 98 connected to the main line 78. One outlet port, designated 99, of the valve is connected through a conduit 100 to an inlet port 104 of an automatic ratio control valve or governor valve, generally designated 105. Valve 105 is shown as operable by a centrifugal governor assembly, generally designated 106. The general construction and arrangement of the governor assembly may correspond to the disclosure of my aforesaid copending application Serial No. 748,382, filed May 16, 1947.

The governor is turned at a speed proportional to the speed of the vehicle and tends, in response to increase of car speed, to move the valve 105 downwardly against opposition of a spring 108, while the valve is urged upwardly by the spring in response to decreasing vehicle speeds. The upper and lower collar portions 107, 109 respectively of the governor, to which the flyweights 113 are articulated, are bodily slidable along the governor shaft 125 and are urged apart by the spring 108. Upward movement of the upper collar 107 is limited by the travel of valve 105, while downward movement of collar 109 is limited by a stop 127 which limits counterclockwise movement of a bellcrank 122 connected to the throttle mechanism in a manner to be described. Upward movement of the collar 109 is limited by a fixed stop 119, and downward movement of the upper collar and valve 105 is limited by a fixed stop 121. A tension spring 123 urges the lower collar 109 downwardly and biases the entire governor assembly and valve 105 downwardly when the governor weights move outwardly sufficiently to draw the collars toward one another. With the vehicle at rest and the selector valve 96 in the forward drive ("F") position, the control valve inlet port 104 is isolated by valve spools 110, 111 and the outlet ports 112, 114 of the control valve are connected with a dump port 115. Port 112 is connected to the conduit 46 leading to the second speed clutch assembly 43—44 previously described, while port 114 is connected to the space within the cylinder 22 for actuation of the direct drive clutch 24.

The throttle valve 116 of the engine is operable by means of an accelerator pedal 118, which is connected through suitable linkage as 275 to a collar 276 rigidly secured to a slidable and limitedly rockable rod 120 leading to the bellcrank 122. (A fragment of the engine is shown at 117.) Bellcrank 122 has a finger portion 124 adapted to bear upwardly upon the lower collar 109 of the governor assembly, such upward pressure being exerted by the finger 124 in response to depression of the accelerator pedal and being adapted to oppose upshifting (downward) movement of the control valve 105, or to cause a downshift, depending upon the relative pressures exerted upon the elements in question, as will be apparent. The other end of the rod 120 is pivotally connected as by a pin 277 to the throttle valve operating arm 278.

The selector valve 96 is shown as provided upon its stem with a plurality of pockets, designated "P" for "park," "N" for "neutral," "F" for "forward," "LU" for positions of the valve obtain when the pockets so denoted "lock-up," and "R" for "reverse," and these respective positions of the valve obtain when the pockets so denoted are in registry with a spring-pressed locating detent or poppet ball 97.

With the valves 96, 105 in the positions shown and the vehicle at rest, fluid is supplied by the front pump 70 only and such fluid enters chamber 280 of the valve 96 through side port 98. Spools 126, 128 are then in position to connect port 98 with ports 130 and 99. Port 130 communicates with a conduit 145 leading to the actuating cylinder 146 for the forward speeds brake band 64. Valve 96 is also provided with a port 132 opposite the port 130, and which communicates through a branch passage 216 with a port 214 nearer the right end of the valve. This port is in effect blocked in the F position, as shown, and the outlet to the governor valve is also blocked off in such value with the vehicle at rest and the governor valve up. Spaced to the right of the port 99 is a discharge port 213, and spacedly to the right of the discharge port is a port 212 which communicates through a conduit 215 with the actuating servomotor cylinder 210 for the lock-up brake band 48, both of the ports 213 and 212 being between the port 99 and the port 214.

With the parts in the condition shown, depressing the accelerator pedal to speed up the engine causes the hydraulic torque converter to drive the vehicle at the low gear ratio in the manner previously described, since the forward brake band 64 is applied so that the vehicle is ready to start as soon as the hydraulic torque converter delivers sufficient torque from the engine. When the vehicle speed has risen sufficiently in proportion to the extent of depression of the accelerator pedal, the valve 105 moves downwardly far enough so that the spool 111 lies between the ports 112, 114, and fluid is then supplied to the second speed clutch 43, 44 by way of conduit 46, to establish the second speed drive, as also previously described. When the valve 105 moves down still further, the spool 111 occupies a position between the ports 114, 115, so that the port 114 is also supplied with fluid by way of the conduit 100 and the chamber of valve 105. As previously stated, port 114 is connected to the actuating cylinder 22 for the direct drive clutch, so that direct drive is then established.

If the valve 96 is moved to the left one notch, to the LU or lock-up position, the spool 128 occupies a position between the ports 130 and 99, while the spool 129 occupies a position between the ports 212, 213. The port 214 is thus unblocked by the spool 129 and fluid is supplied from the main line by way of port 98 and the valve chamber 280 to the ports 130 and 132. The fluid supplied to the port 130 keeps the forward drive brake band 64 applied, as will be understood, and the fluid supplied to the port 132 passes through the passage 216 and ports 214, 212 to conduit 215, and then to the lockup servomotor cylinder 210. Port 99 is then connected to drain port 213 so that when the governor valve is in a lowered position the passages connected thereto are drained through port 213, while if the governor valve is raised these passages are vented through drain port 115. In lockup as well as in all other positions of selector valve 96 except the reverse position, the reverse servomotor cylinder 42 is drained through the open left end of the selector valve casing.

In the reverse drive position of valve 96, the spool 126 closes the left end of the valve casing and the port 141 which is connected by way of a conduit 165 to the actuating servomotor cylinder 42 for the reverse drive brake band 40. The spool 128 then lies between the port 98 and the other ports to the right of port 98, so that fluid is only delivered to the reverse drive brake band. Passages 100 and 145 are both then connected to drain port 213 via passage 216, spool 129 lying between the ports 99 and 213, so that the other servomotors are vented.

When the valve 96 is moved to the right one notch from the position shown, to the neutral position designated "N," the spool 126 moves to a position to cover the inlet port 98, so that fluid is not delivered to any of the clutches or brake bands, and the actuating means for all of the clutches and brake bands are connected to drain. At such time, port 141 communicates to drain through the open left end of the valve chamber and spool 128 lies between ports 212 and 213, so that ports 99 and 130 communicate directly with the drain port 213 and port 212 communicates with the drain port by way of port 214, branch passage 216, port 132 and the interior of the valve chamber. In the "park" position represented by movement of the valve 96 all the way to the right, to the position "P," the port 98 is still covered by the spool 126, and the movement to and from this position may be utilized to actuate an auxiliary device such as a parking brake, as is known in the art. See for example Neracher et al. Patent No. 2,328,392, granted August 31, 1943, showing a friction-type parking brake which could be so actuated. See also Product Engineering January, 1950, pages 94–96, showing a latch-type parking brake which could be similarly actuated.

The system is also shown as provided with cushioning and antishock means, including the hydropneumatic accumulator 230, the construction and arrangement of which may correspond to the disclosure of my copending application Serial No. 171,042, filed June 29, 1950. Fluid is fed to the main line 78 through a restricted orifice 102, which is located to the left of the point of connection of the reservoir. A branch conduit 79, through which fluid may be supplied to the interior of the torque converter, is connected to the main line to the left of the restriction 102.

The rear pump 74 may be designed to supply its full output pressure at low car speed, as for example at 4 to 5 miles per hour.

A conduit 302 which constitutes a branch of the conduit 76, connects the rear pump output to a cylindrical chamber 303 which is at one end of (and shown as in axial alignment with) the valve 105, and which contains a rod 304 slidable therein and actuatable by a piston portion 306 carried by the rod. A nose portion 308 of the rod is engageable with the end of the spool 110 at the opposite end of the valve 105 from the end to which the governor is connected. Pressure from the rear pump accordingly tends to move the valve 105 downwardly from the low speed position in which it is shown in Fig. 2, to the intermediate speed position. Beyond the intermediate position, the rod 304 has no effect upon the automatic control valve 105, because the downward travel of the rod 304 is limited by an abutment collar 310 on the rod which engages the upper end of the casing of valve 105 when the latter valve has been moved downwardly to a position corresponding to the intermediate speed position.

The fluid conduit system 76, 302 from the rear pump also incorporates a restricted bleed orifice 311. The fluid pressure acting upon the rod 304 tends to move the control valve 105 in the same upshifting direction as the governor moves the valve in response to increasing car speed, during operation in the lowest forward driving range, but the parts are so proportioned that the full fluid pressure from the rear pump, acting alone, is not sufficient to shift the valve against the resistance of spring 108, so that the joint action of the governor and rod 304 is required for such an upshift. It will be seen that the rod 304 also opposes a downshift, and the parts are so proportioned that the downshift will not occur until the car has come practically to rest. This delayed downshift action is assisted by the fact that the fluid must bleed from the rear pump conduit system, at a rate controlled by orifice 311, to permit the rod 304 to move upwardly. The rod 304 is smaller in diameter than its bore and is guided in its bore by a spool 307 spaced from and coacting with the piston 306, both the spools and piston being relatively short axially. This arrangement prevents likelihood of sticking of the rod in event of the presence of any dirt, or of any distortion of the rod or its bore.

The throttle actuating system is shown as incorporating a detent mechanism consisting of a rounded protrusion 313 formed on the rod 120 and which is yieldably engageable with and adapted to snap past a rounded nose portion 314 formed upon the lower end of a poppet stem 315 urged downwardly into the path of the protrusion 313 by a spring 316. These parts are so positioned and proportioned that even up to fairly high vehicle speeds, the pressure exerted upon the governor assembly by depression of the accelerator pedal sufficiently to move the rod 120 far enough to move the protrusion 313 under the detent poppet nose 314, will cause a downshift. The fluid pressures and the proportioning of the parts may be such that at light throttle the upshift from low to second will occur at about 6 miles per hour, whereas if the accelerator pedal is depressed past the detent, the shift from low to second will occur at about 22 miles per hour. The hydraulic torque converter is advantageous in this combination, because it tends to make up the torque that is lost by shifting to the higher geared ratio. The upshift can scarcely be felt at such low speeds because of the proportionately smaller change in engine speed which occurs, due to the change in gearing ratio. Quieter and more economical operation of the vehicle results from the fact that undesirable downshifts do not occur, even at very low speeds, when the torque demand upon the car is not high. If an attempt were made to design the governor to respond to such low speeds, the spring, corresponding to the spring 108, would have to be so light and the parts would have to be so sensitive that reliability would not be achieved. The slightest friction of the parts would be greater than the force the spring could develop.

It will be appreciated that other control features might be incorporated and various modifications introduced without departing from the spirit and scope of the present invention as expressed in the appended claims.

What is claimed is:

1. In a control system for an automatic transmission having a driving element and a drivable element and incorporating a range of forward speed ratios, a ratio controlling member movable to vary the forward speed ratio, governing means influenced by speed variations of the drivable element throughout a relatively wide speed range for automatically actuating said ratio controlling member throughout a range of travel corresponding to said relatively wide speed range, to vary the speed ratio, a biasing member movable in response to movement of the drivable element and exerting a biasing effort upon said ratio controlling member throughout less than the full range of travel of said ratio controlling member, to modify, throughout a narrower range of speed variances, the ratio-varying influence of said governing means.

2. In a hydraulic control system for an automatic transmission having a driving element and a drivable element and incorporating a range of forward speed ratios, a ratio controlling valve member movable to vary the forward speed ratio, means influenced by speed variations of the drivable element throughout a relatively wide speed range for automatically actuating said valve member throughout a range of travel corresponding to said relatively wide speed range, to vary the speed ratio, means including a fluid pump operable in response to movement of the drivable element and which develops substantially full output at low speeds of said drivable element, and means operable by the pressure developed by said pump for exerting a biasing effort upon said valve throughout a portion only of the travel of the valve.

3. In a hydraulic control system for an automatic transmission having a driving element and a drivable element and incorporating a range of forward speed ratios, a ratio controlling valve member movable to vary the forward speed ratio, means influenced by speed variations of the drivable element throughout a relatively wide speed range for automatically actuating said valve member throughout a range of travel corresponding to said relatively wide speed range, to vary the speed ratio, means including a fluid pump operable in response to movement of the drivable element and which develops substantially full output at low speeds of said drivable element, and means operable by the pressure developed by said pump for exerting a biasing effort upon said valve throughout a portion only of the travel of the valve, the effort exerted by said biasing means being insufficient to move said valve independently of said first-named means.

4. In a hydraulic control system for an automatic transmission having a driving element and a drivable element and incorporating a hydrodynamic torque converter and a plurality of forward speed ratios at least one of which is a geared starting ratio, a ratio controlling valve member movable to a plurality of positions each of which corresponds to one of said forward ratios, governing means influenced by speed variations of the drivable element throughout a relatively wide speed range for automatically actuating said valve member to such positions, one of said positions corresponding to a starting ratio and another of said positions corresponding to a higher speed ratio, and means responsive to rotation of the drivable element at a low speed for biasing said valve member from the starting ratio position toward the higher speed ratio position.

5. In a hydraulic control system for an automatic transmission having a driving element and a drivable element and incorporating a hydrodynamic torque converter and a plurality of forward speed geared ratios, a ratio controlling valve member movable to a plurality of positions each of which corresponds to one of said geared drive ratios, governing means influenced by speed variations of the drivable element throughout a relatively wide speed range for automatically actuating said valve member to such positions, one of said positions corresponding to a low speed geared drive and another of said positions corresponding to an intermediate speed geared drive, and means responsive to rotation of the drivable element at a low speed for biasing said valve member from the low speed position toward the intermediate speed position.

6. In a control system for an automatic transmission having a driving element and a drivable element and incorporating a range of forward speed ratios, a ratio controlling member movable to vary the forward speed ratio, governing means influenced by drivable element speed variations throughout said entire range commencing at a standstill, for automatically actuating said ratio controlling member throughout a range of travel corresponding to said speed range, to vary the speed ratio, a biasing member operable in response to starting and stopping of the drivable element and exerting a biasing effort upon said ratio controlling member throughout a low speed portion only of the range of travel of said ratio controlling member, to modify, throughout a low speed range of speed variances, the ratio-varying influence of said governing means.

7. In a hydraulic control system for an automatic transmission having a driving element and a drivable element and incorporating a hydrodynamic torque converter and a plurality of forward speed ratios at least one of which is a geared starting ratio, a ratio controlling valve member movable to a plurality of positions each of which corresponds to one of said forward ratios, governing means influenced by speed variations of the drivable element throughout a relatively wide speed range for automatically actuating said valve member to such positions, one of said positions corresponding to a starting ratio and another of said positions corresponding at a higher speed ratio, a biasing member yieldably urging said valve member from the starting position toward a higher speed ratio position with a force insufficient to move said valve member without the coaction of the governing means, means operable in response to rotation of the drivable element for activating said biasing member and for deactivating said biasing member when said drivable element is substantially at rest.

8. In a hydraulic control system for an automatic transmission having a driving element and a drivable element and incorporating a hydrodynamic torque converter and a plurality of forward speed ratios at least one of which is a geared starting ratio, a ratio controlling valve member movable to a plurality of positions each of which corresponds to one of said forward ratios, governing means influenced by speed variations of the drivable element throughout a relatively wide speed range for automatically actuating said valve member to such positions, one of said positions corresponding to a starting ratio and another of said positions corresponding to a higher speed ratio, a fluid actuatable biasing member yieldably urging said valve member from the starting position toward a higher speed ratio position with a force insufficient to move said valve member without the coaction of the governing means, and pump means operable in response to rotation of the drivable element for activating said biasing member, whereby said biasing member is deactivated when the output of said pump means falls away as the drivable element comes substantially to rest.

9. In a hydraulic control system for an automatic transmission having a driving element and a drivable element and incorporating a hydrodynamic torque converter and a plurality of forward speed ratios at least one of which is a geared starting ratio, a ratio controlling valve member movable to a plurality of positions each of which corresponds to one of said forward ratios, governing means influenced by speed variations of the drivable element throughout a relatively wide speed range for automatically actuating said valve member to such positions, one of said positions corresponding to a starting ratio and another of said positions corresponding to a higher speed ratio, a fluid actuatable biasing member yieldably urging said valve member from the starting position toward a higher speed ratio position with a force insufficient to move said valve member without the coaction of the governing means, pump means operable in response to rotation of the drivable element for activating said biasing member, and a bleed orifice portion communicating with said pump means and with said fluid actuatable biasing member, whereby said biasing member is deactivated when the output of said pump means falls away as the drivable element comes substantially to rest.

10. In a hydraulic control system for an automatic transmission having a driving element and a drivable element and incorporating a range of forward speed ratios including a starting range, an intermediate range, and a high speed range, a ratio controlling member movable to positions corresponding to all three of said ranges and operable to vary the forward speed ratio between all of said ranges, governing means for automatically actuating said ratio controlling member throughout all of said speed ranges, and a biasing member operable by and in response to movement of the drivable element and operatively interconnectible with such ratio controlling member when the latter is in the position corresponding to said intermediate range and opposing downshifting thereof only, without interfering with either upshifting or downshifting, between the intermediate range and high range.

References Cited in the file of this patent

UNITED STATES PATENTS

| Number | Name | Date |
|---|---|---|
| 1,958,303 | Hayes | May 8, 1934 |
| 2,008,231 | Vincent | July 16, 1935 |
| 2,108,666 | Hall | Feb. 15, 1938 |
| 2,120,104 | Livermore | June 7, 1938 |
| 2,210,239 | Hale | Aug. 6, 1940 |
| 2,223,716 | Bojesen | Dec. 3, 1940 |
| 2,251,625 | Hale | Aug. 5, 1941 |
| 2,260,406 | Roche | Oct. 28, 1941 |
| 2,352,212 | Lang | June 27, 1944 |
| 2,402,248 | Hale | June 18, 1946 |
| 2,516,203 | Greenlee | July 25, 1950 |
| 2,566,519 | Farkas | Sept. 4, 1951 |
| 2,575,522 | McFarland | Nov. 20, 1951 |
| 2,627,189 | McFarland | Feb. 3, 1953 |

UNITED STATES PATENT OFFICE
CERTIFICATE OF CORRECTION

Patent No. 2,703,500  
March 8, 1955

Clifton R. Roche

It is hereby certified that error appears in the printed specification of the above numbered patent requiring correction and that the said Letters Patent should read as corrected below.

Column 2, line 43 and column 3, line 2, for "sum" read --sun--; line 42 for "wil" read --will--; column 4, line 69, strike out "positions of the valve obtain when the pockets so denoted".

Signed and sealed this 19th day of April, 1955.

(SEAL)

Attest:

E. J. MURRY

Attesting Officer

ROBERT C. WATSON  
Commissioner of Patents